US011254281B2

(12) United States Patent
Hayakawa (10) Patent No.: US 11,254,281 B2
(45) Date of Patent: Feb. 22, 2022

(54) AIRBAG

(71) Applicant: Joyson Safety Systems Japan K.K., Tokyo (JP)

(72) Inventor: Shinji Hayakawa, Shiga (JP)

(73) Assignee: Joyson Safety Systems Japan K.K., Tokyo (JP)

( * ) Notice: Subject to any disclaimer, the term of this patent is extended or adjusted under 35 U.S.C. 154(b) by 0 days.

(21) Appl. No.: 17/051,499

(22) PCT Filed: May 23, 2019

(86) PCT No.: PCT/JP2019/020396
§ 371 (c)(1),
(2) Date: Oct. 29, 2020

(87) PCT Pub. No.: WO2019/230544
PCT Pub. Date: Dec. 5, 2019

(65) Prior Publication Data
US 2021/0221322 A1      Jul. 22, 2021

(30) Foreign Application Priority Data

May 31, 2018   (JP) .............................. JP2018-105098

(51) Int. Cl.
*B60R 21/231*   (2011.01)
*B60R 21/203*   (2006.01)
*B60R 21/2338*  (2011.01)

(52) U.S. Cl.
CPC ........ *B60R 21/2338* (2013.01); *B60R 21/203* (2013.01); *B60R 21/231* (2013.01); *B60R 2021/23382* (2013.01)

(58) Field of Classification Search
CPC . B60R 21/231; B60R 21/2338; B60R 21/203; B60R 21/205; B60R 2021/23382; B60R 2021/23153
(Continued)

(56) References Cited

U.S. PATENT DOCUMENTS 10,618,492 B2 *   4/2020   Aranzulla ............. B60R 21/203
10,710,542 B2 *   7/2020   Aranzulla ............. B60R 21/231
(Continued)

FOREIGN PATENT DOCUMENTS

EP      2202120      6/2010
JP      H11-020586   1/1999
(Continued)

OTHER PUBLICATIONS

International Search Report for PCT/JP2019/020396 dated Jul. 9, 2019.

*Primary Examiner* — Keith J Frisby
(74) *Attorney, Agent, or Firm* — IPUSA, PLLC (57) ABSTRACT

An airbag includes a front panel and a rear panel, and the outer peripheries of the front panel and the rear panel are joined together. Each of the front panel and the rear panel has a propeller shape in which a plurality of blade portions extend radially from a center portion such that recessed portions are formed between adjacent blade portions in plan view before the front panel and the rear panel are joined. The plurality of blade portions of the front panel are joined to corresponding recessed portions of the rear panel, and the plurality of blade portions of the rear panel are joined to corresponding recessed portions of the front panel.

13 Claims, 7 Drawing Sheets

(58) Field of Classification Search
USPC .................................. 280/743.1, 731, 743.2
See application file for complete search history.

(56) References Cited

U.S. PATENT DOCUMENTS

| | | | | |
|---|---|---|---|---|
| 2005/0236823 | A1* | 10/2005 | Schuetz | B60R 21/2338 |
| | | | | 280/743.2 |
| 2005/0285379 | A1 | 12/2005 | Soderquist | |
| 2006/0197320 | A1* | 9/2006 | Abe | B60R 21/233 |
| | | | | 280/729 |
| 2013/0276213 | A1* | 10/2013 | Olsson | A42B 3/0486 |
| | | | | 2/413 |
| 2018/0001865 | A1 | 1/2018 | Ooka et al. | |

FOREIGN PATENT DOCUMENTS

| | | |
|---|---|---|
| JP | 2002-046568 | 2/2002 |
| JP | 2006-008124 | 1/2006 |
| JP | 2011-057155 | 3/2011 |
| JP | 2014-121965 | 7/2014 |
| JP | 2014-172570 | 9/2014 |
| JP | 2018-001975 | 1/2018 |
| WO | 2009/082305 | 7/2009 |

\* cited by examiner

AIRBAG

TECHNICAL FIELD

The present invention relates to an airbag.

BACKGROUND ART

Figure 1:
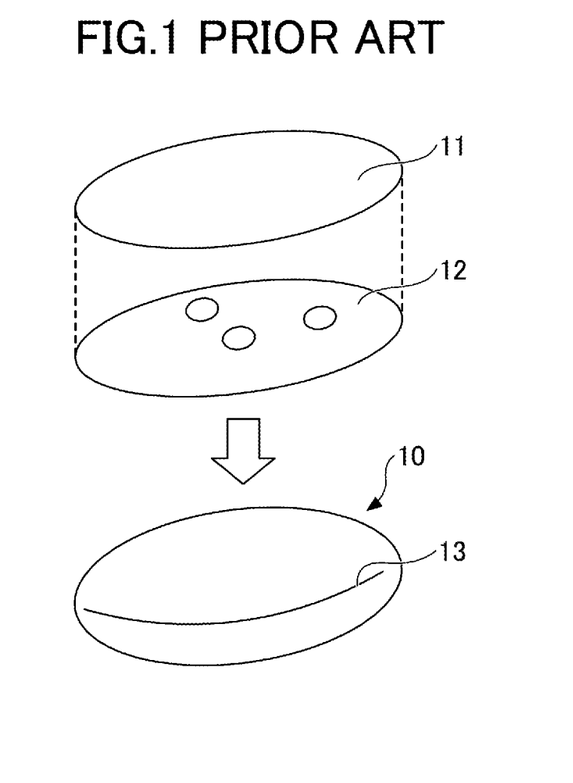
FIG. 1 is a diagram illustrating an airbag in which the outer peripheries of circular panels are joined together.

As illustrated in FIG. 1, an airbag 10 including a circular front panel 11 and a circular rear panel 12 is known, for example. In the airbag 10, the outer peripheries 13 of the front panel 11 and the rear panel 12 are joined together.

RELATED-ART DOCUMENTS

Patent Documents

[Patent Document 1] Japanese Laid-open Patent Publication No. 2018-1975

SUMMARY OF THE INVENTION

Problem to be Solved by the Invention

Figure 2:
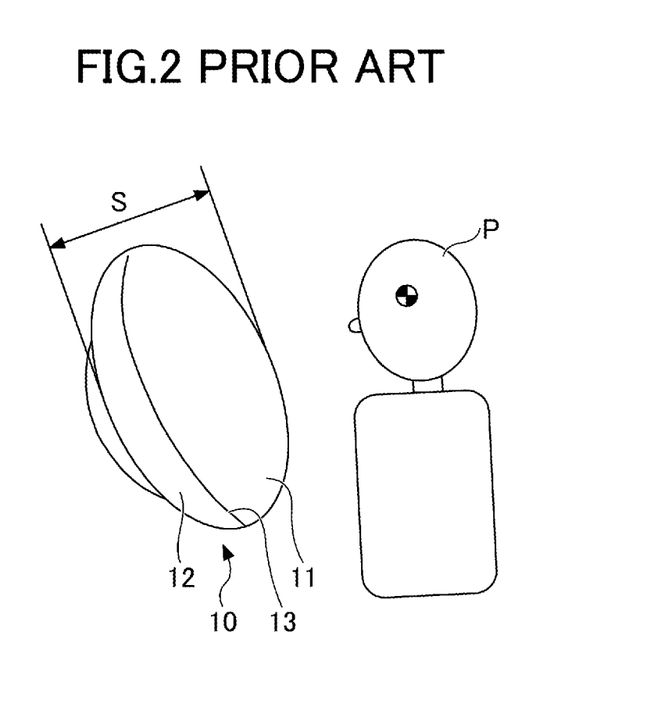
FIG. 2 is a diagram illustrating the stroke of the airbag when fully inflated in a direction toward an occupant.

However, as illustrated in FIG. 2, in the airbag having a circular panel shape, the diameters of both panels need to be increased in order to increase a stroke S of the airbag when fully inflated in a direction toward an occupant P. As a result, the airbag volume increases, and thus, the size and weight of the airbag increases.

In view of the above, the present disclosure provides an airbag that can minimize an increase in airbag volume, while increasing the stroke of the airbag when fully inflated.

Means to Solve the Problem

According to the present disclosure, an airbag includes a front panel and a rear panel, and the outer peripheries of the front panel and the rear panel are joined together. Each of the front panel and the rear panel has a propeller shape in which a plurality of blade portions extend radially from a center portion such that recessed portions are formed between adjacent blade portions in plan view before the front panel and the rear panel are joined. The plurality of blade portions of the front panel are joined to corresponding recessed portions of the rear panel, and the plurality of blade portions of the rear panel are joined to corresponding recessed portions of the front panel.

Effects of the Invention

According to the present disclosure, an airbag capable of minimizing an increase in airbag volume, while increasing the stroke of the airbag when fully inflated can be provided.

MODE FOR CARRYING OUT THE INVENTION

In the following, embodiments of the present invention will be described with reference to the accompanying drawings. In the drawings, an X-axis, a Y-axis, and a Z-axis are orthogonal to one another. An X-axis direction, a Y-axis direction, and a Z-axis direction respectively indicate a direction parallel to the X-axis, a direction parallel to the Y-axis, and a direction parallel to the Z-axis. An XY plane, a YZ plane, and a ZX plane respectively indicate a plane including the X-axis and the Y-axis, a plane including the Y-axis and the Z-axis, and a plane including the Z-axis and the X-axis.

Figure 3:
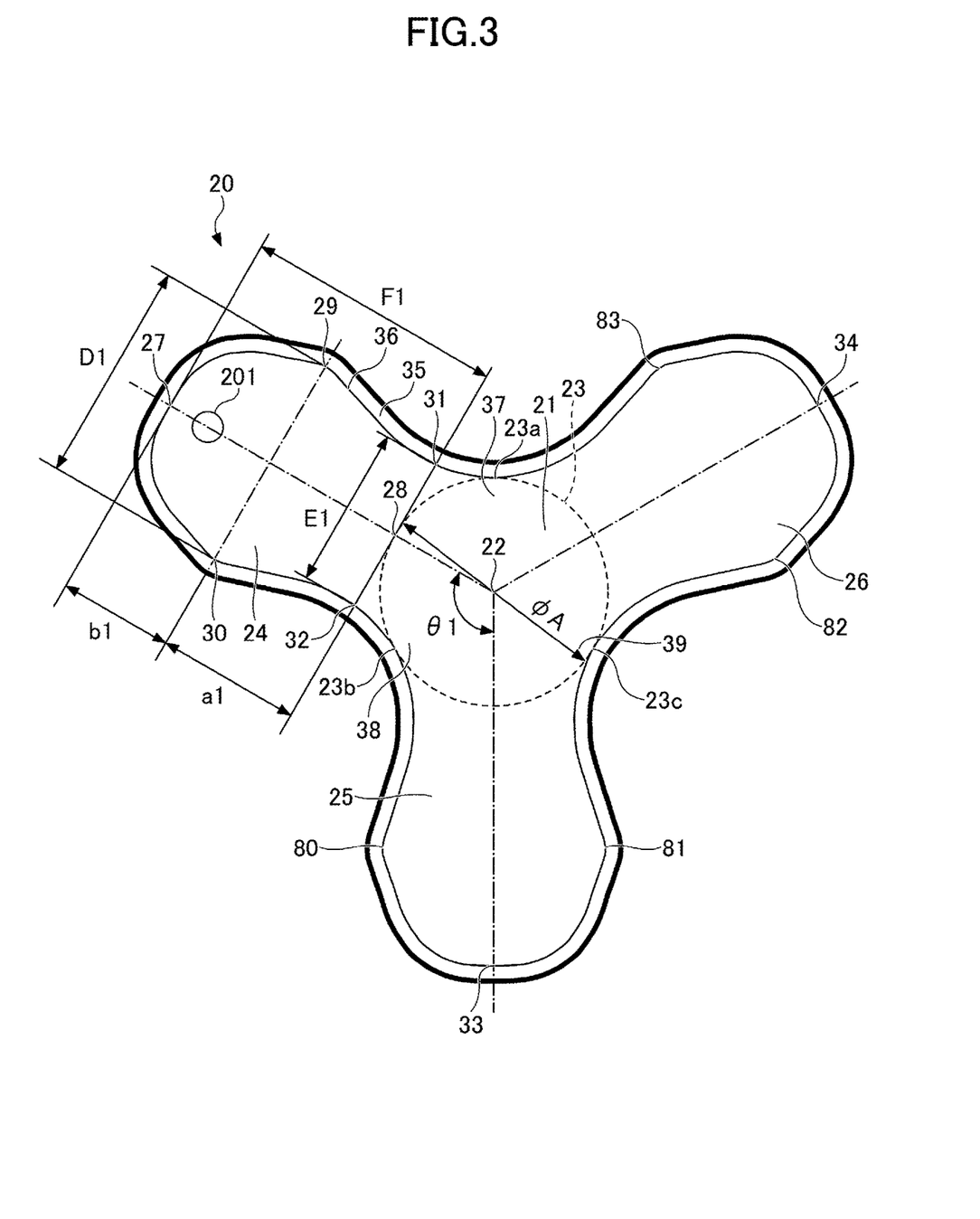
FIG. 3 is a plan view of a front panel of an airbag according to a first embodiment.
Figure 4:
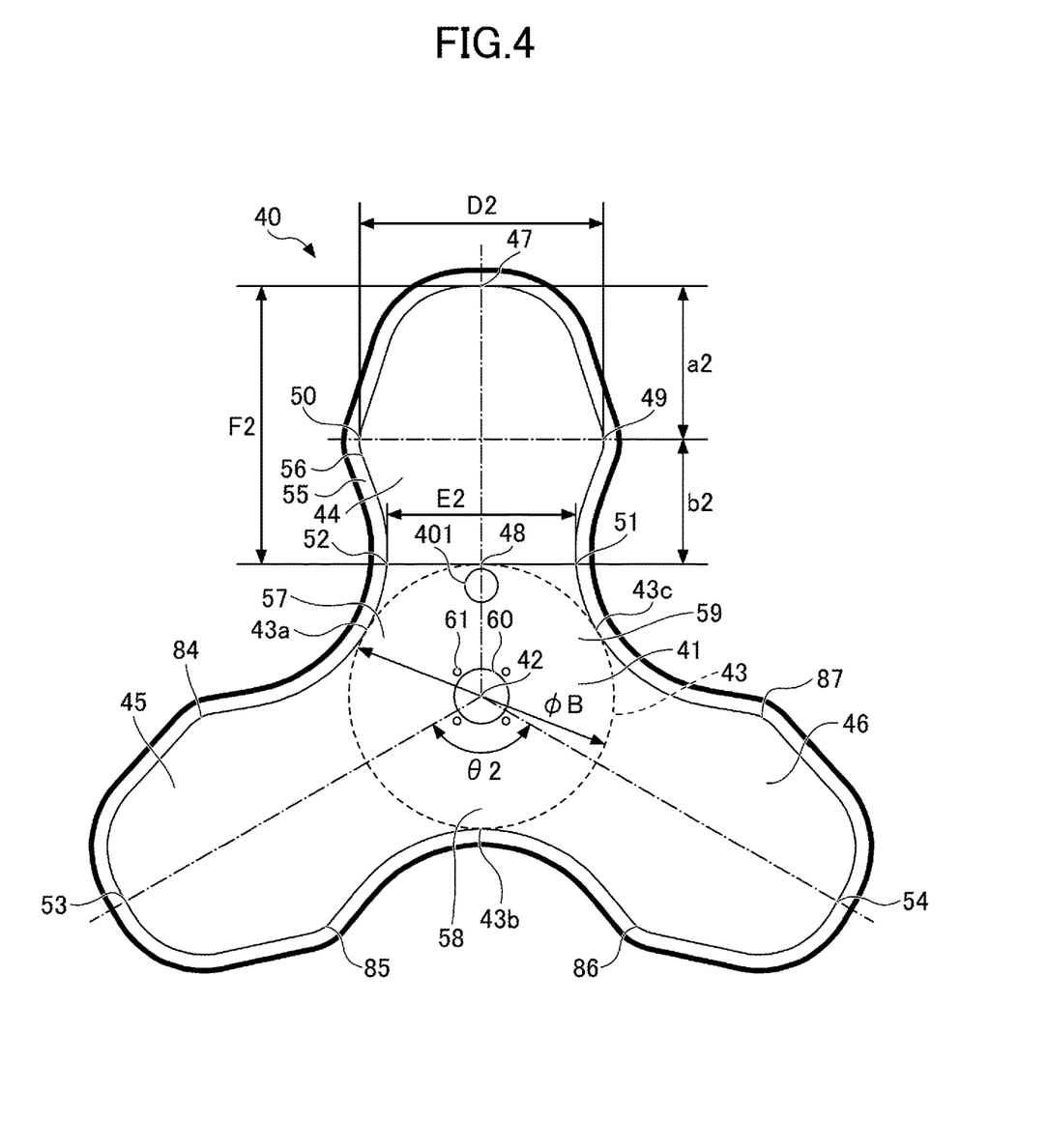
FIG. 4 is a plan view of a rear panel of the airbag according to the first embodiment.
Figure 5:
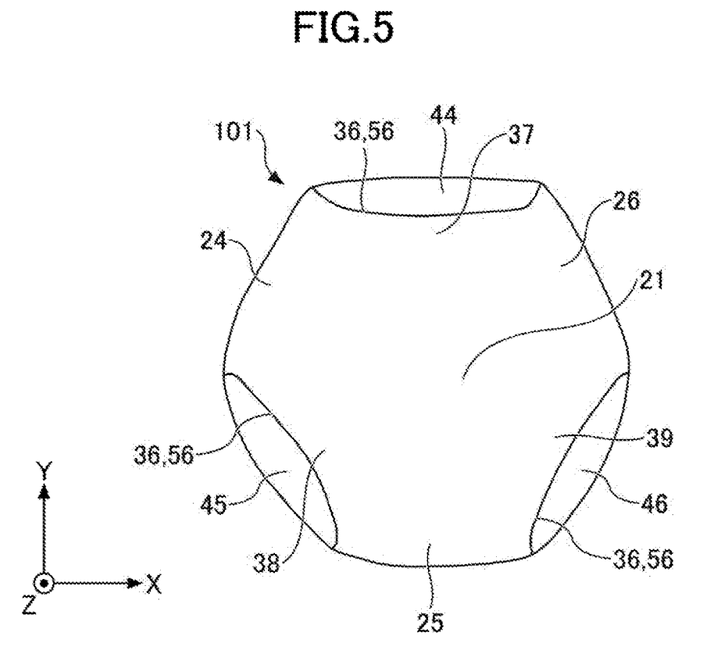
FIG. 5 is a front view of the airbag when fully inflated.
Figure 6:
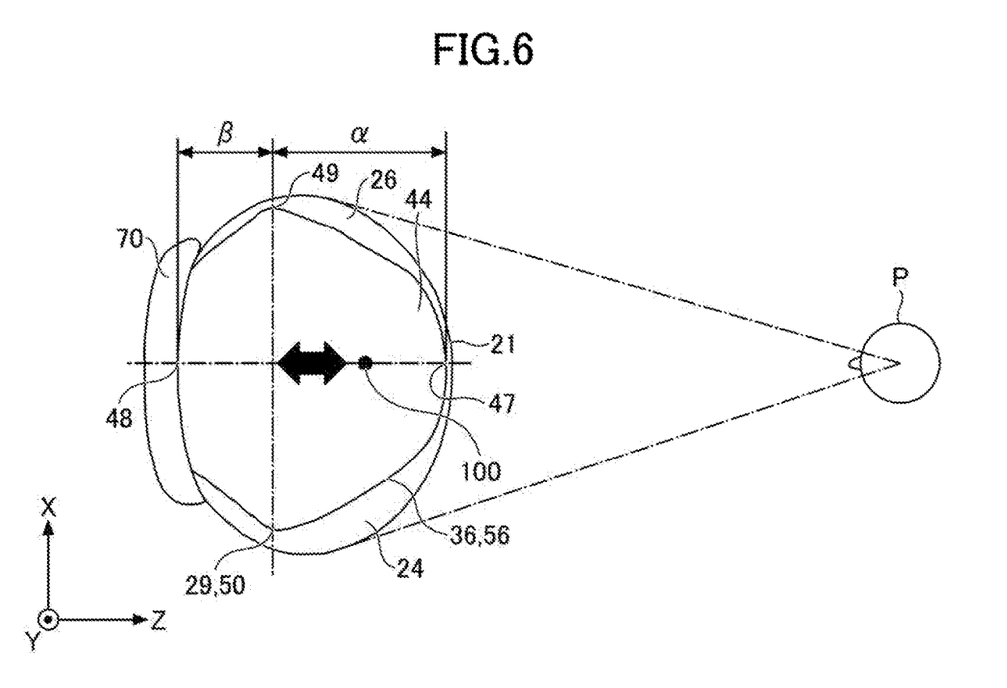
FIG. 6 is a top view of the airbag when fully inflated.
Figure 7:
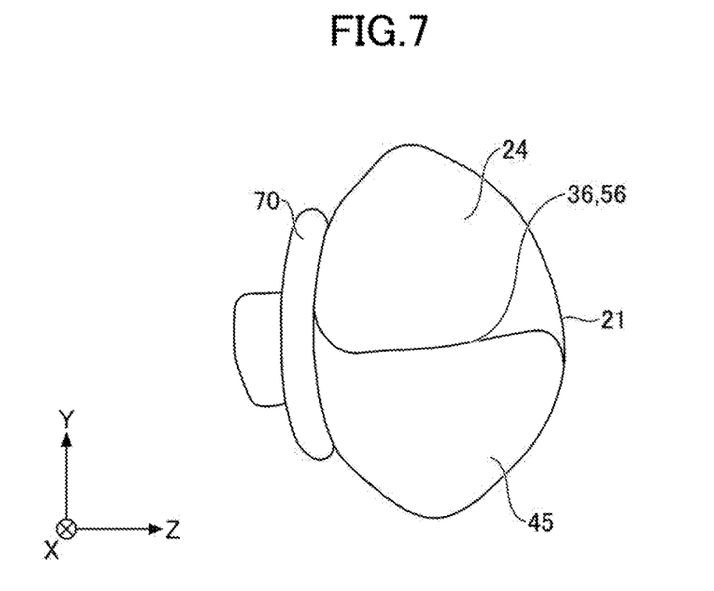
FIG. 7 is a side view of the airbag when fully inflated.

FIG. 3 is a plan view of a front panel 20 of an airbag 101 according to a first embodiment. FIG. 4 is a plan view of a rear panel 40 of the airbag 101 according to the first embodiment. FIG. 5, FIG. 6, and FIG. 7 are a front view, a top view, and a side view of the airbag 101 when fully inflated, respectively, according to the first embodiment. The airbag 101 includes the front panel 20 and the rear panel 40. The airbag 101 is an inflatable and deployable component in which the outer peripheries of the front panel 20 and the rear panel 40 are joined together. The airbag 101 is inflated and deployed to restrain the movement of an occupant of a vehicle.

The airbag 101 is housed in a folded state before inflation and deployment. At the time of vehicular collision, the airbag 101 housed in the folded state is supplied with gas from an inflator. As a result, the airbag 101 is inflated and deployed.

The airbag 101 is an airbag for a driver's seat, and is housed in a steering wheel 70. However, the airbag according to the present invention is not limited to an airbag for a driver's seat, and may be an airbag for a front passenger seat or a rear seat.

FIG. 3 is a plan view of the front panel 20 before being joined to the rear panel 40. The front, panel 20 is a panel on the occupant side, and includes a center portion 21 that faces the occupant when the airbag 101 is inflated and deployed.

The front panel 20 is made of a base fabric having a propeller shape, in which a plurality of blade portions 24 through 26 extend radially from the center portion 21 such that recessed portions are formed between adjacent blade portions in plan view before the front panel 20 is joined to the rear panel 40. In FIG. 3, the front panel 20 includes the three blade portions 24 through 26 and three recessed portions 37 through 39. The first recessed portion 37 is formed between the first blade portion 24 and the third blade portion 26, the second recessed portion 38 is formed between the first blade portion 24 and the second blade portion 25, and the third recessed portion 39 is formed between the second blade portion 25 and the third blade portion 26.

In the present embodiment, the center portion 21 represents a circular area centered at a center point 22 and having a diameter $\phi A$. The plurality of blade portions 24 through 26 extend radially from the center portion 21 at equal intervals of an angle θ1 (120° in FIG. 3).

FIG. 4 is a plan view of the rear panel 40 before being joined to the front panel 20. The rear panel 40 is a panel on the side opposite to the occupant, and includes a center portion 41 that has an opening 60. The inflator is inserted into the opening 60 for attachment.

The rear panel 40 is made of a base fabric having a propeller shape, in which a plurality of blade portions 44 through 46 extend radially from the center portion 41 such that recessed portions are formed between adjacent blade portions in plan view before the rear panel 40 is joined to the front panel 20. In FIG. 4, the rear panel 40 includes the three blade portions 44 through 46 and three recessed portions 57 through 59. The number of the blade portions 44 through 46 of the rear panel 40 is the same as the number of the blade portions 22 through 26 of the front panel 20, and the number of the recessed portions 57 through 59 of the rear panel 40 is the same as the number of the recessed portions 37 through 39 of the front panel 20. The fourth recessed portion 57 is formed between the fourth blade portion 44 and the fifth blade portion 45, the fifth recessed portion 58 is formed between the fifth blade portion 45 and the sixth blade portion 46, and the sixth recessed portion 53 is formed between the sixth blade portion 46 and the fourth blade portion 44.

In the present embodiment, the center portion 41 represents a circular area centered at a center point 42 and having a diameter φB. The plurality of blade portions 44 through 46 extend radially from the center portion 41 at equal intervals of an angle θ2 (120° in FIG. 4). A plurality of fixing holes 61 for fixing the rear panel 40 to a retainer (not illustrated) are formed around the opening 60 of the center portion 41.

In FIG. 3 and FIG. 4, the plurality of portions 24 through 26 of the front panel 20 are joined to the recessed portions 57 through 59 of the rear panel 40, respectively, and the plurality of blade portions 44 through 46 of the rear panel 40 are joined to the recessed portions 37 through 39 of the front panel 20, respectively. That is, the first blade portion 24 is joined to the fourth recessed portion 57, the second blade portion 25 is joined to the fifth recessed portion 58, and the third blade portion 26 is joined to the sixth recessed portion 59. Further, the fourth blade portion 44 is joined to the first recessed portion 37, the fifth blade portion 45 is joined to the second recessed portion 36, and the sixth blade portion 46 is joined to the third recessed portion 39.

By joining the outer periphery of the propeller-shaped front panel 20 to the outer periphery of the propeller-shaped rear panel 40, the airbag 101 is formed. FIG. 5 through FIG. 7 denote the airbag 101 when fully inflated. The stroke of the airbag 101 when fully inflated in the direction facing the occupant can be increased by increasing the length in the radial direction of each of the blade portions 24 through 26 and 44 through 46. Because the plurality of blade portions of the panels fit into the corresponding recessed portions of the panels, an increase in the volume of the airbag 101 can be minimized even when the length in the radial direction of each of the blade portions 24 through 26 and 44 through 46 is increased.

Therefore, in the airbag 101 according to the present embodiment, an increase in airbag volume can be minimized, and also the stroke of the airbag 101 when fully inflated can be increased. In addition, because an increase in airbag volume can be minimized even when the stroke of the airbag 101 when fully inflated is increased, the outer shape of the airbag 101 in the folded state can be decreased. Thus, the airbag 101 can be compactly housed. Further, because an increase in airbag volume can be minimized, the stroke of the airbag 101 when fully inflated can be increased without using an inflator capable of supplying a large amount of gas.

In FIG. 3 and FIG. 4, the outer periphery of the front panel 20 and the cuter periphery of the rear panel 40 may be joined by being sewn together with a thread. The outer peripheries of the front and rear panels are joined together, such that a joining line 36 formed along the outer peripheral edge of the front panel 20 coincides with a joining line 56 formed along the outer peripheral edge of the rear panel 40. In a case where the outer periphery of the front panel 20 and the cuter periphery of the rear panel 40 are joined by being sewn together, the joining lines 36 and 56 correspond to sewing lines.

In FIG. 3, the joining line 36 contacts contact points 23a, 23b, and 23c of a circular outer edge 23 of the center portion 21. Further, a peripheral portion 35 is formed between the outer peripheral edge and the joining line 36 of the front panel 20. In FIG. 4, the joining line 56 contacts contact points 43a, 43b, and 43c of a circular outer edge 43 of the center portion 41. Further, a peripheral portion 55 is formed between the outer peripheral edge and the joining line 56 of the rear panel 40. The joining line 36 and the joining line 56 are joined together such that the peripheral portions 35 and 55 are located inside the airbag 101.

In the present embodiment, the outer periphery of the front panel 20 and the outer periphery of the rear panel 40 have the same peripheral length, and are joined together. Therefore, the front panel 20 and the rear panel 40 do not readily twist when joined together. In FIG. 3 and FIG. 4, the peripheral length represents the length of the joining lines 36 and 56. Further, in the present embodiment, the plurality of blade portions 24 through 26 of the front panel 20 have the same outer peripheral shape, and the plurality of blade portions 44 through 46 have the same outer peripheral shape. Therefore, the front panel 20 and the rear panel 40 do not readily twist when joined together.

A maximum length F1 in the radial direction of each of the blade portions 24 through 26 illustrated in FIG. 3 is preferably greater than a maximum length D1 in the width direction perpendicular to the radial direction. For convenience, in the example illustrated in FIG. 3, the maximum length F1 of the first blade portion 24 represents the shortest distance between a portion 28, where the first blade portion 24 contacts the cancer portion 21, and a tip portion 27 in the radial direction of the first blade portion 24. The same applies to the maximum length F1 of each of the second blade portion 25 and the third blade portion 26. For convenience, in the example illustrated in FIG. 3, the maximum length D1 of the first blade portion 24 represents the shortest distance between one outer edge portion 29 and the other outer edge portion 30 of a middle portion whose length in the width direction perpendicular to the radial direction becomes maximum. The outer edge portions 29 and 30 are located on the joining line 36. The same applies to the maximum length D1 of each of the second blade portion 25 and the third blade portion 26.

Similarly, a maximum length F2 in the radial direction of each of the blade portions 44 through 46 illustrated in FIG. 4 is preferably greater than a maximum length D2 in the width direction perpendicular to the radial direction. For convenience, in the example illustrated in FIG. 4, the maximum length F2 of the fourth blade portion 44 represents the shortest distance between a portion 48, where the fourth blade portion 44 contacts the center portion 41, and a tip portion 47 in the radial direction of the fourth blade portion 44. The same applies co the maximum length F2 of each of the fifth blade portion 45 and the sixth blade portion

46. For convenience, in the example illustrated in FIG. 4, the maximum length D2 of the fourth blade portion 44 represents the shortest distance between one outer edge portion 49 and the other outer edge portion 50 of a middle portion whose length in the width direction perpendicular to the radial direction becomes maximum. The outer edge portions 49 and 50 are located on the joining line 56. The same applies to the maximum length D2 of each of the fifth blade portion 45 and the sixth blade portion 46.

As described above, by setting the lengths F1 to be longer than the lengths D1 and lengths F2 to be longer than the lengths D2, an increase in airbag volume can be minimized, and also the stroke of the airbag 101 when fully inflated can be readily increased.

In the examples of FIG. 3 and FIG. 4, each of the blade portions 24 through 26 and 44 through 46 includes a middle portion whose length in the width direction perpendicular to the radial direction becomes maximum, and also includes a tip portion in the radial direction. Specifically, the plurality of blade portions 24 through 26 include tip portions 27, 33, and 34, respectively. The plurality of blade portions 44 through 46 include tip portion 47, 53, and 54, respectively. Further, the middle portion of each of the blade portions 24 through 26 and 44 through 46 includes a pair of outer edge portions that are bent so as to project in the width direction perpendicular to the radial direction. For example, the middle portion of the first blade portion 24 includes the pair of outer edge portions 29 and 30 that project in opposite directions to each other. The middle portion of the fourth blade portion 44 includes the pair of outer edge portions 49 and 50 that project in opposite directions to each other.

The pair of outer edge portions 29 and 30 of the front panel 20 is joined to a pair of outer edge portions 50 and 84. The outer edge portions 50 and 84 are located at the recessed portion 57 formed between the adjacent blade portions 44 and 45 of the rear panel 40. A pair of outer edge portions 80 and 81 are joined to a pair of outer edge portions 85 and 86. The outer edge portions 85 and 86 are located at the recessed portion 58 formed between the adjacent blade portions 45 and 46 of the rear panel 40. A pair of outer edge portions 82 and 83 is joined to a pair of outer edge portions 87 and 49. The outer edge portions 87 and 49 are located at the recessed portion 59 formed between the adjacent blade portions 46 and 44 of the rear panel 40.

As described above, the front panel 20 and the rear panel 40 are joined together such that the outer edge portions of the front panel 20 coincide with the cuter edge portions of the rear panel 40. Accordingly, as illustrated in FIG. 6, a maximum width portion wider than the center portion 21 can be formed. Thus, even when the head of an occupant P does not directly contact the center portion 21 of the airbag 101 (that is, when the head of the occupant P contacts the left or right side of the airbag 101), the occupant P can be restrained by the maximum width portion wider than the center portion 21 of the airbag 101.

The length D1 in the width direction of the middle, portion of each of the blade portions 24 through 26 illustrated in FIG. 3 is preferably greater than a length E1 in the width direction of a portion 28 where each of the blade portions 24 through 26 contacts the center portion 21. For convenience, in the example illustrated in FIG. 3, the length E1 represents the shortest distance between a pair of intersections 31 and 32 where a tangent line to the circular center portion 21 at the portion 28 crosses the joining line 36.

Similarly, the length D2 in the width direction of the middle portion of each of the blade portions 44 through 46 illustrated in FIG. 4 is preferably greater than a length E2 in the width direction of a portion 48 where each of the blade portions 44 through 46 contacts the center portion 41. For convenience, in the example illustrated in FIG. 4, the length E2 represents the shortest distance between intersections 51 and 52 where a tangent line to the circular center portion 41 at the portion 48 crosses the joining line 56.

The maximum width portion wider than the center portion 21 can be readily formed by setting the length D1 to be longer than the length E1 in each of the blade portions 24 through 26 of the front panel 20 and setting the length D2 to be longer than the length E2 in each of the blade portions 44 through 46 of the rear panel 40.

For example, a length b1 from the middle portion to the tip portion is set to be less than a length a1 from the center portion 21 to the middle portion in each of the blade portions 24 through 26 of the front panel 20. Further, a length a2 from the middle portion to the tip portion is set to be greater than a length b2 from the center portion 41 to the middle portion in each of the blade portions 44 through 46 of the rear panel 40. With the above-described dimension relationship, at maximum inflation of the airbag 101 as illustrated in FIG. 6, a stroke length $\alpha$ on the occupant P side relative to the maximum width portion can be made greater than a stroke length $\beta$ on the side opposite to the occupant P relative to the maximum width portion.

Accordingly, a center of gravity 100 of the airbag 101 can be positioned on the negative Z-side relative to the maximum width portion.

Alternatively, the length b1 from the middle portion to the tip portion may be set to be greater than the length a1 from the center portion 21 to the middle portion in each of the blade portions 24 through 26 of the front panel 20. Further, the length a2 from the middle portion to the tip portion may be set to be less than the length b2 from the center portion 41 to the middle portion in each of the blade portions 44 through 46 of the rear panel 40. With the above-described dimension relationship, at maximum inflation of the airbag 101, the stroke length $\alpha$ of the airbag 101 on the occupant P side relative to the maximum width portion can be made less than the stroke length $\beta$ on the side opposite to the occupant P relative to the maximum width portion. Accordingly, the center of gravity 100 of the airbag 101 can be positioned on the positive Z-side relative to the maximum width portion.

Alternatively, the length b1 from the middle portion to the tip portion may be set to be equal to the length a1 from the center portion 21 to the middle portion in each of the blade portions 24 through 26 of the front panel 20. Further, the length a2 from the middle portion to the tip portion may be set to be equal to the length b2 from the center portion 41 to the middle portion in each of the blade portions 44 through 46 of the rear panel 40. With the above-described dimension relationship, at maximum inflation of the airbag 101, the stroke length $\alpha$ on the occupant P side relative to the maximum width portion can be made equal to the stroke length $\beta$ on the side opposite to the occupant P relative to the maximum width portion. Accordingly, the center of gravity 100 of the airbag 101 can be positioned in the vicinity of the maximum width portion.

The center of gravity 100 illustrated in FIG. 6 does not necessarily indicate an accurate location of the center of gravity.

Further, at least one blade portion of the plurality of blade portions 44 through 46 of the rear panel 40 illustrated in FIG. 4 may include at least one vent hole 401 on the side closer to the center portion 41 than to the middle portion of the at least one blade portion. Accordingly, gas in the airbag 101 can be discharged from the side of the airbag 101 opposite to the occupant P. For example, one or more vent holes 401 may be formed in the center portion 41.

Further, instead of or in addition to the at least one vent hole 401 formed in the rear panel 40, at least one vent hole 201 may be formed in the front panel 20 illustrated in FIG. 3. In this case, at least one blade portion of the plurality of blade portions 24 through 26 of the front panel 20 may include at least one vent hole 201 on the side closer to the tip portion than to the middle portion of the at least one blade portion. Accordingly, gas in the airbag 101 can be discharged from the side of the airbag 101 opposite to the occupant P. For example, one or more vent holes 201 may be formed in an area between the middle portion and the tip portion of the at least one blade portion.

Figure 8:
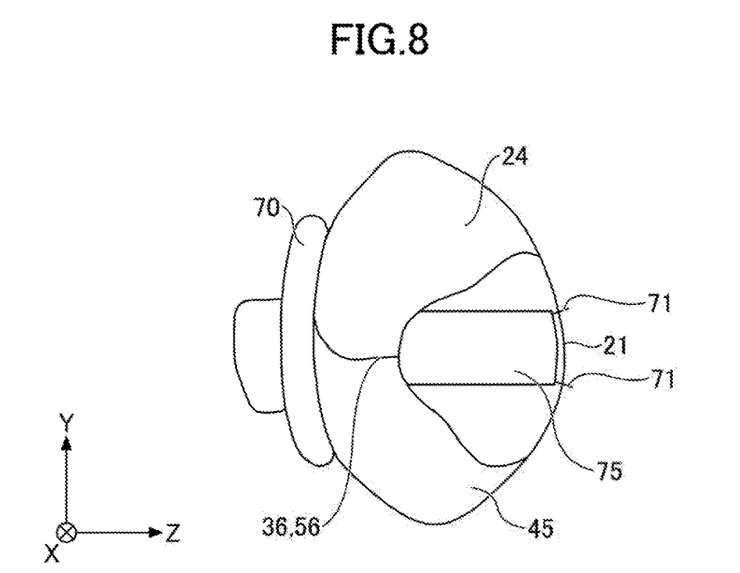
FIG. 8 is a partial cross-sectional view of the airbag when fully inflated.

Further, as illustrated in FIG. 8, at least one tether 75 may be provided in the airbag 101. A connection portion 71 of the tether 75 is connected to the center portion 21 of the front panel 20, and another connection portion 71 is connected to the center portion 41 of the rear panel 40. Accordingly, the center portion 21, with which the occupant P may make contact when the airbag 101 is fully inflated, can be formed in a planar shape or formed in a recessed shape in which the center portion 21 is recessed toward the inside of the airbag 101.

Figure 9:
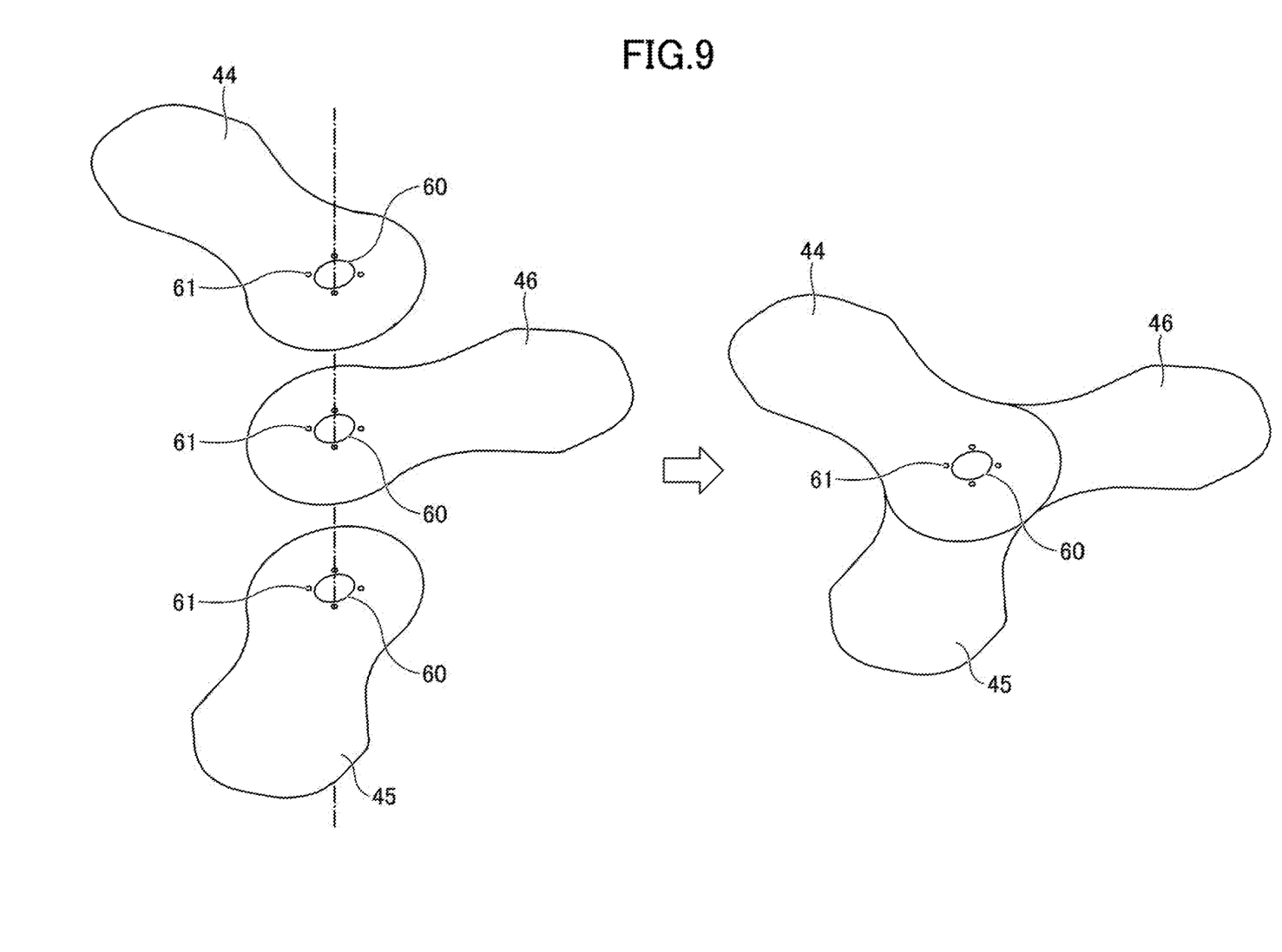
FIG. 9 is a perspective view of a panel of an airbag according to a second embodiment.

FIG. 9 is a perspective view of a panel of an airbag according to a second embodiment. A description of a configuration and advantageous effects of the second embodiment, similar to those of the first embodiment, will be omitted.

In the first embodiment, each of the front panel and the rear panel is formed of one base fabric. However, one or both of the front panel and the rear panel may be formed of a plurality of base fabrics. In the second embodiment illustrated in FIG. 9, a rear panel 40 is formed of three base fabrics, and each of three blade portions 44 through 46 is formed of one base fabric. By dividing the rear panel 40 into the three blade portions 44 through 46, the orientation of threads in each of the base fabrics can be changed.

Figure 10:
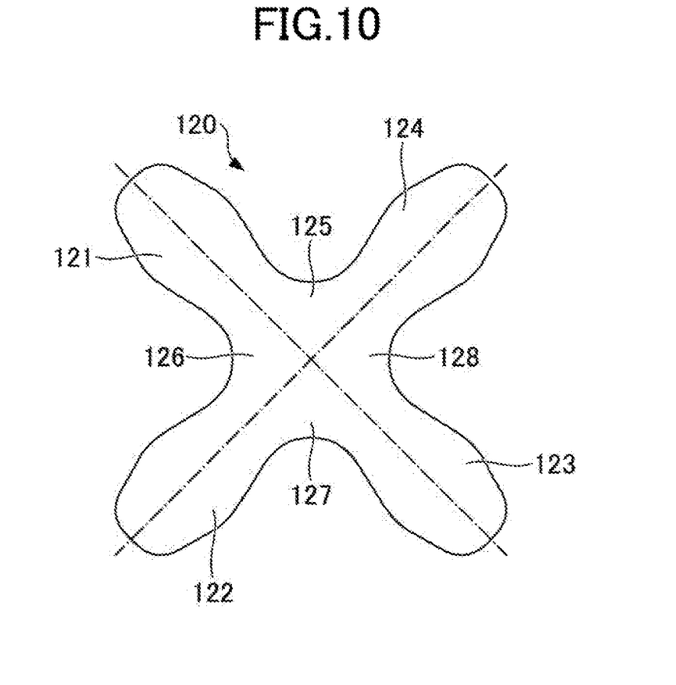
FIG. 10 is a plan view of a front panel of an airbag according to a third embodiment.
Figure 11:
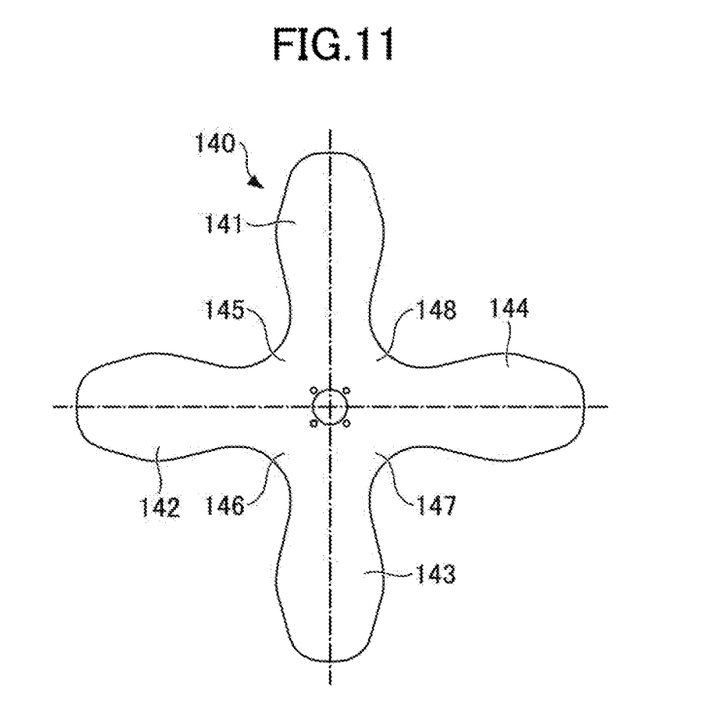
FIG. 11 is a plan view of a rear panel of the airbag according to the third embodiment.

FIG. 10 is a plan view of a front panel of an airbag according to a third embodiment. FIG. 11 is a plan view of a rear panel of the airbag according to the third embodiment. A description of a configuration and advantageous effects of the third embodiment, similar to those of the above-described embodiments, will be omitted.

In the first embodiment, each of the front panel and the rear panel includes the three blade portions. However, each of the front panel and the rear panel does not necessarily include the three blade portions, and may include any number of blade portions other than 3. As the number of blade portions increases, the outer shape of the airbag as viewed from the front becomes close to a circle. For example, the airbag including the three blade portions according to the first embodiment is formed in a hexagonal shape as viewed from the front (see FIG. 5). If the airbag includes two blade portions, the airbag is formed in a square shape as viewed from the front. If the airbag includes four blade portions, the airbag is formed in an octagonal shape as viewed from the front.

In FIG. 10, a front panel 120 is made of a fabric having a propeller shape, in which four blade portions 121 through 124 extend radially from the center portion such that recessed portions are formed between adjacent blade portions in plan view before the front panel 120 is joined to a rear panel. In the example of FIG. 10, the front panel 120 includes the four blade portions 121 through 124 and four recessed portions 125 through 128.

In FIG. 11, a rear panel 140 is made of a fabric having a propeller shape, in which four blade portions 141 through 144 extend radially from the center portion such that recessed portions are formed between adjacent blade portions in plan view before the rear panel 140 is joined to the front panel 120. In the example of FIG. 11, the rear panel 140 includes the four blade portions 141 through 144 and four recessed portions 145 through 148. The number of the blade portions 141 through 144 is the same as the number of the blade portions 121 through 124 of the front panel 120, and the number of the recessed portions 145 through 148 is the same as the number of the recessed portions 125 through 128 of the front panel 120.

The plurality of blade portions 121 through 124 of the front panel 120 are joined to the corresponding recessed portions 145 through 148 of the rear panel 140. The plurality of blade portions 141 through 144 of the rear panel 140 are joined to the corresponding recessed portions 125 through 126 of the front panel 120.

Accordingly, the airbag according to the third embodiment can minimize an increase in airbag volume, while increasing the stroke of the airbag when fully inflated.

Although specific embodiments have been described above, the present invention is not limited to the above-described embodiments. Variations, modifications, and substitutions of a part or all of the embodiments may be made without departing from the scope of the present invention.

For example, if the external shape of an airbag when fully inflated is not required to be uniform, a plurality of blade portions of a front panel do not necessarily have the same outer peripheral shape, and a plurality of blade portions of a rear panel do not necessarily have the same outer peripheral shape. For example, if the blade portions of the airbag have the same shape, the airbag inflates uniformly and symmetrically in the circumferential direction as viewed from the front. Conversely, if the blade portions have different shapes, the airbag can inflate asymmetrically in the circumferential direction as viewed from the front.

This application is based on and claims priority to Japanese Patent Application No. 2018-105098, filed on May 31, 2018, the entire contents of which are incorporated herein by reference.

DESCRIPTION OF THE REFERENCE NUMERALS

20 front panel
21 center portion
24, 25, 26 blade portion
37, 38, 39 recessed portion
40 rear panel
41 center portion
44, 45, 46 blade portion
57, 58, 59 recessed portion
60 opening
61 fixing hole
70 steering wheel
71 connection portion
75 tether
100 center of gravity
101 airbag

The invention claimed is:
1. An airbag comprising:
a front panel; and a rear panel, outer peripheries of the front panel and the rear panel being joined together, wherein each of the front panel and the rear panel has a propeller shape in which a plurality of blade portions extend radially from a center portion such that recessed portions are formed between adjacent blade portions in plan view before the front panel and the rear panel are joined, and the plurality of blade portions of the front panel are joined to corresponding recessed portions of the rear panel, and the plurality of blade portions of the rear panel are joined to corresponding recessed portions of the front panel.

2. The airbag according to claim 1, wherein a maximum length in a radial direction of each of the blade portions is greater than a maximum length in a width direction perpendicular to the radial direction.

3. The airbag according to claim 2, wherein each of the blade portions includes a middle portion whose length in the width direction perpendicular to the radial direction becomes maximum, and also includes a tip portion in the radial direction.

4. The airbag according to claim 3, wherein a length in the width direction of the middle portion of each of the blade portions is greater than a length in the width direction of a portion where each of the blade portions contacts the center portion.

5. The airbag according to claim 3, wherein the middle portion includes outer edge portions that are bent so as to project in the width direction perpendicular to the radial direction.

6. The airbag according to claim 5, wherein the front panel and the rear panel are joined together such that the outer edge portions of the front panel coincide with the outer edge portions of the rear panel.

7. The airbag according to claim 3, wherein a length from a middle portion to a tip portion is greater than a length from a center portion to the middle portion of each of the blade portions of the front panel, and a length from a middle portion to a tip portion is less than a length from a center portion to the middle portion of each of the blade portions of the rear panel.

8. The airbag according to claim 3, wherein a length from a middle portion to a tip portion is less than a length from a center portion to the middle portion of each of the blade portions of the front panel, and a length from a middle portion to a tip portion is greater than a length from a center portion to the middle portion of each of the blade portions of the rear panel.

9. The airbag according to claim 3, wherein a length from a middle portion to a tip portion is equal to a length from a center portion to the middle portion of each of the blade portions of the front panel, and a length from a middle portion to a tip portion is equal to a length from a center portion to the middle portion of each of the blade portions of the rear panel.

10. The airbag according to claim 3, wherein the rear panel includes at least one vent hole on a side closer to a center portion than to a middle portion.

11. The airbag according to claim 3, wherein the front panel includes at least one vent hole on a side closer to a tip portion than to a middle portion.

12. The airbag according to claim 1, wherein the outer peripheries of the front panel and the rear panel have a same peripheral length, and are joined together.

13. The airbag according to claim 1, wherein the plurality of blade portions of the front panel have a same outer peripheral shape, and the plurality of blade portions of the rear panel have a same outer peripheral shape.

* * * * *